(12) United States Patent
Lewis et al.

(10) Patent No.: US 11,381,882 B2
(45) Date of Patent: *Jul. 5, 2022

(54) EPISODIC TIMELY NOTIFICATION

(71) Applicant: Google LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,602

(22) Filed: Mar. 29, 2021

(65) Prior Publication Data

US 2021/0219024 A1    Jul. 15, 2021

Related U.S. Application Data

(63) Continuation of application No. 16/388,707, filed on Apr. 18, 2019, now Pat. No. 10,965,996, which is a
(Continued)

(51) Int. Cl.
*H04N 21/488* (2011.01)
*H04N 21/84* (2011.01)
(Continued)

(52) U.S. Cl.
CPC ..... *H04N 21/4882* (2013.01); *G06Q 30/0631* (2013.01); *G06Q 50/01* (2013.01);
(Continued)

(58) Field of Classification Search
CPC .......... H04N 21/4882; H04N 21/4532; H04N 21/25891; H04N 21/4667; H04N 21/252;
(Continued)

(56) References Cited

U.S. PATENT DOCUMENTS

| 6,490,725 B2 | 12/2002 | Kikinis |
| 7,199,842 B2 | 4/2007 | Jackson |

(Continued)

FOREIGN PATENT DOCUMENTS

| CN | 101551825 | 10/2009 |
| WO | 00/58967 A1 | 10/2000 |

OTHER PUBLICATIONS

Patent Cooperation Treaty, International Search Report and Written Opinion of the International Searching Authority for International Application No. PCT/US2016/051539, dated Nov. 23, 2016, 10 pages.

(Continued)

*Primary Examiner* — Anthony Bantamoi
(74) *Attorney, Agent, or Firm* — Lowenstein Sandler LLP

(57) ABSTRACT

A notifiable event pertaining to a series of videos may be detected, wherein detecting the notifiable event comprises searching a log pertaining to the series of videos. A user who has watched a portion of at least one video in the series of videos or at least one video in the series of videos may be determined, wherein the user is assigned an affinity score indicating a user interest to continue viewing the series of videos. A notification identifying the notifiable event pertaining to the series of videos may be generated, the notification comprising a reference to an unwatched next video in the series of videos. The notification may be transmitted to the user.

20 Claims, 7 Drawing Sheets

Related U.S. Application Data continuation of application No. 14/855,344, filed on Sep. 15, 2015, now Pat. No. 10,271,106.

(51) Int. Cl.

| | |
|---|---|
| *H04N 21/442* | (2011.01) |
| *H04N 21/4788* | (2011.01) |
| *H04N 21/262* | (2011.01) |
| *H04N 21/25* | (2011.01) |
| *H04N 21/466* | (2011.01) |
| *H04N 21/258* | (2011.01) |
| *H04N 21/45* | (2011.01) |
| *G06Q 30/06* | (2012.01) |
| *G06Q 50/00* | (2012.01) |

(52) U.S. Cl.
CPC ..... *H04N 21/252* (2013.01); *H04N 21/25891* (2013.01); *H04N 21/262* (2013.01); *H04N 21/442* (2013.01); *H04N 21/4532* (2013.01); *H04N 21/4667* (2013.01); *H04N 21/4788* (2013.01); *H04N 21/84* (2013.01)

(58) Field of Classification Search
CPC .............. H04N 21/262; H04N 21/4788; H04N 21/442; H04N 21/84; G06Q 50/01; G06Q 30/0631
See application file for complete search history.

(56) References Cited

U.S. PATENT DOCUMENTS

| | | | |
|---|---|---|---|
| 7,872,691 B2 | 1/2011 | Strickland | |
| 7,937,380 B2 | 5/2011 | Spiegelman | |
| 8,196,166 B2 | 6/2012 | Roberts | |
| 8,265,458 B2 | 9/2012 | Helmstetter | |
| 8,627,378 B2 | 1/2014 | Cordray | |
| 8,666,808 B2 | 3/2014 | Klug et al. | |
| 8,745,669 B2 | 6/2014 | Knudson et al. | |
| 8,973,038 B2 | 3/2015 | Gratton | |
| 9,064,154 B2 | 6/2015 | Kocks et al. | |
| 9,768,974 B1 | 9/2017 | Lewis et al. | |
| 2003/0229896 A1 | 12/2003 | Buczak | |
| 2004/0034873 A1 | 2/2004 | Zenoni | |
| 2004/0177370 A1 | 9/2004 | Dudkiewicz | |
| 2004/0268403 A1 | 12/2004 | Krieger et al. | |
| 2006/0282856 A1 | 12/2006 | Errico et al. | |
| 2007/0283382 A1 | 12/2007 | Boston et al. | |
| 2010/0017819 A1 | 1/2010 | Gerbrandt et al. | |
| 2010/0058395 A1 | 3/2010 | Goergen et al. | |
| 2010/0138865 A1 | 6/2010 | Rai et al. | |
| 2010/0146077 A1 | 6/2010 | Davies et al. | |
| 2010/0153137 A1 | 6/2010 | Rao et al. | |
| 2010/0199295 A1 | 8/2010 | Katpelly et al. | |
| 2010/0280641 A1* | 11/2010 | Harkness | G06F 17/00 |
| 2011/0202956 A1 | 8/2011 | Connelly et al. | |
| 2012/0030050 A1 | 2/2012 | Rey et al. | |
| 2012/0072543 A1 | 3/2012 | Kalmanje et al. | |
| 2014/0068090 A1 | 3/2014 | Wang et al. | |
| 2014/0215349 A1 | 7/2014 | Kosslyn et al. | |
| 2014/0282714 A1 | 9/2014 | Hussain | |
| 2015/0039685 A1 | 2/2015 | Lewis et al. | |
| 2015/0066583 A1* | 3/2015 | Liu | G06Q 30/0201 |
| 2015/0067724 A1 | 3/2015 | Johnson et al. | |
| 2015/0095775 A1 | 4/2015 | Lewis et al. | |
| 2015/0237409 A1 | 8/2015 | Harper et al. | |
| 2016/0316268 A1 | 10/2016 | Carmichael et al. | |
| 2018/0013799 A1 | 1/2018 | Davies | |

OTHER PUBLICATIONS

Profis, "How to Get Text Message Reminders for Your Favorite TV Shows", http://www.cnet.com/how-to/how-to-get-text-message-reminders-for-your-favorite-tv-shows/, Tech Culture, Nov. 21, 2011, 12 pages.

* cited by examiner

EPISODIC TIMELY NOTIFICATION

RELATED APPLICATION

This application is a continuation of and claims priority to U.S. patent application Ser. No. 16/388,707 filed on Apr. 18, 2019, which is a continuation of U.S. patent application Ser. No. 14/855,344 filed on Sep. 15, 2015, now U.S. Pat. No. 10,271,106, which are hereby incorporated by reference.

TECHNICAL FIELD

This disclosure relates to the field of notifications and, in particular, to a customized timely notification, generated based on a notifiable event pertaining to a series, alerting a user to an episode of a video in the series.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, and otherwise interact with the provided content. The shared content may include content from professional content creators. The shared content may include movie clips, television (TV) clips, and music videos, as well as content from amateur content creators, e.g., video blogging and short original videos. The content sharing platform may provide notifications to the users. For example, the notifications may deliver a message informing a user about the availability of a particular media content item.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Aspects of the present disclosure may include a method to generate one or more custom timely notifications indicative of a notifiable event pertaining to a series of videos for transmitting to a user who has consumed a portion of a video in the series. A notifiable event pertaining to a series of videos is detected by a processing device, wherein detecting the notifiable event comprises searching a log pertaining to the series of videos. A user who has watched a portion of at least one video in the series of videos or at least one video in the series of videos is determined, wherein the user is assigned an affinity score indicating a user interest to continue viewing the series of videos. A notification identifying the notifiable event pertaining to the series of videos is generated, the notification comprising a reference to an unwatched next video in the series of videos. The notification is transmitted to the user.

A further aspect of the disclosure provides a non-transitory computer readable medium comprising instructions, which when executed by a processing device, cause the processing device to perform operations comprising: detecting a notifiable event pertaining to a series of videos, wherein detecting the notifiable event comprises searching a log pertaining to the series of videos; determining a user who has watched a portion of at least one video in the series of videos or at least one video in the series of videos, wherein the user is assigned an affinity score indicating a user interest to continue viewing the series of videos; generating a notification identifying the notifiable event pertaining to the series of videos, the notification comprising a reference to an unwatched next video in the series of videos; and transmitting the notification to the user.

A further aspect of the disclosure provides a system comprising: a memory; and a processing device, operatively coupled with the memory, to: detect a notifiable event pertaining to a series of videos, wherein detecting the notifiable event comprises searching a log pertaining to the series of videos; determine a user who has watched a portion of at least one video in the series of videos or at least one video in the series of videos, wherein the user is assigned an affinity score indicating a user interest to continue viewing the series of videos; generate a notification identifying the notifiable event pertaining to the series of videos, the notification comprising a reference to an unwatched next video in the series of videos; and transmit the notification to the user.

BRIEF DESCRIPTION OF THE DRAWINGS

The present disclosure is illustrated by way of example, and not by way of limitation, in the figures of the accompanying drawings.

DETAILED DESCRIPTION

Figure 1:
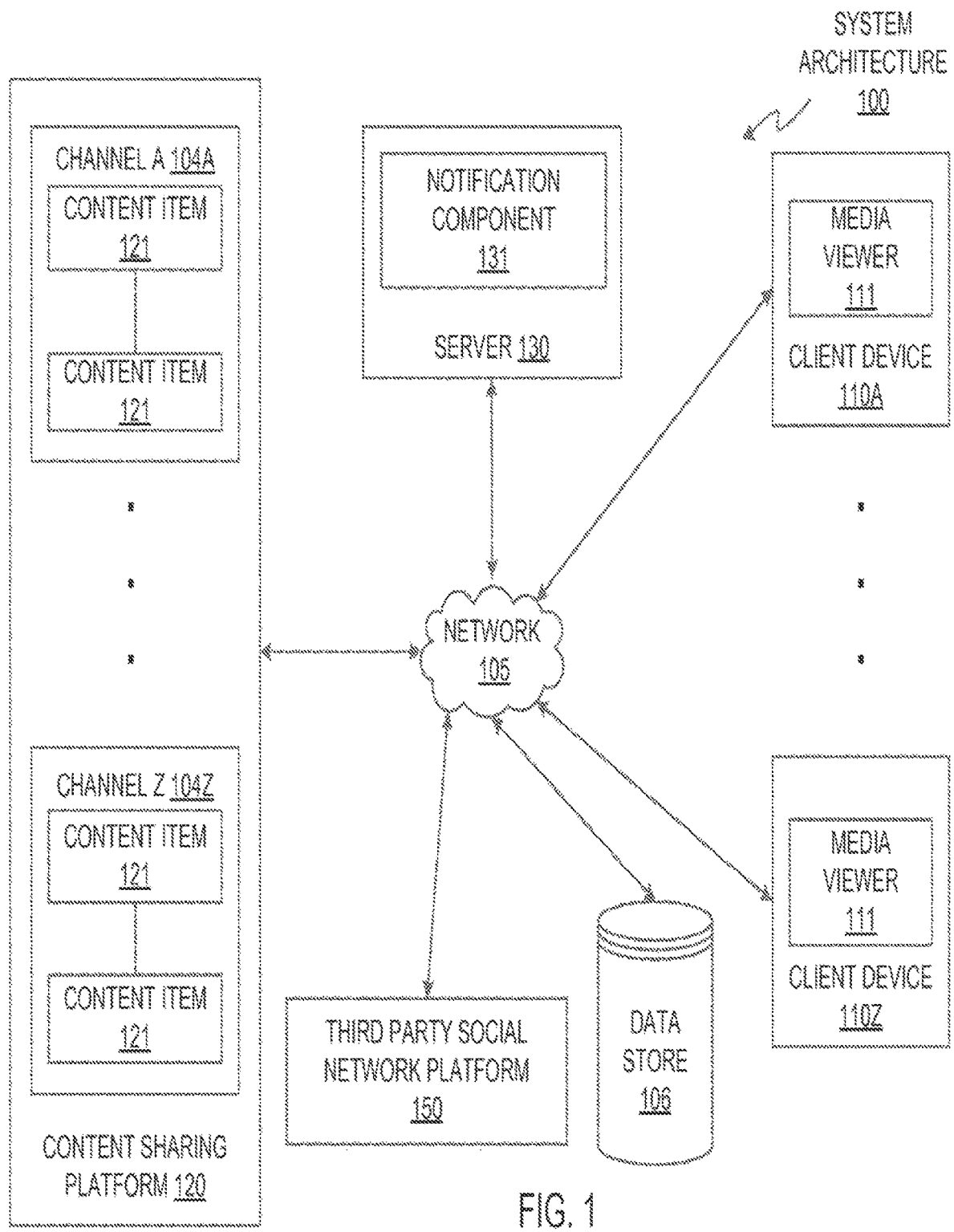
FIG. 1 illustrates an example system architecture in which implementations of the present disclosure may operate.

Aspects and implementations of the disclosure are directed to providing customized timely notifications based on a series of episodic content items (e.g., videos in a series). Specifically, implementations are described for a notification component that can provide notifications of notifiable events pertaining to series to users of a content sharing platform. A notifiable event refers to an occurrence of a predetermined type of activity (e.g., user activity on the content sharing platform or a third party platform) that is designated to trigger a notification of the occurred activity or a related activity to one or more users. A notifiable event can pertain to content hosted by the content sharing platform such as a series of episodic videos. A notifiable event pertaining to such a series may be, for example, a social event (e.g., a user's contact endorsing a video from the series), a creator event (e.g., a series creator adding new metadata [e.g., to tag an actor] to a video from the series), a user event (e.g., a user submitting a search query related to the series), a video list event (e.g., a series view count event exceeding a particular threshold) or other events.

Once the notifiable event pertaining to the series is detected, it may be determined that one or more users have partially viewed the series (e.g., completed viewing some but not all videos from the series, viewed a portion of a video from the series, etc.). One or more users who have highest affinity scores with respect to the series are then selected. A user's affinity score with respect to a series may indicate a level of the user's interest in the series. The affinity score for the user, with respect to the series, can be determined based on the user's viewing history related to the series, such as the number of consumed videos from the series, the overall length of the consumed videos, recency of the latest consumed video, etc. For example, if the user consumes nine out of ten video episodes in the series, the user is considered to have a strong interest in the series and is thus assigned a high affinity score. If another user has consumed one or two episodes, or has not completed watching any episodes, that user may be assigned a lower affinity score than the user who has consumed more episodes.

Upon selecting users with highest affinity scores with respect to the series, a notification indicative of the notifiable event is generated for each of the users. In some implementations, each user may receive a customized notification. For example, the notification may be customized for a particular user to include a reference to the video or the video's portion that has not been previously viewed by the particular user. Because the notification is triggered by the notifiable event that may be of importance to the user, and because the series is of interest to the user as indicated by the user's affinity score, there is a significantly higher likelihood that the user will access the unviewed portion of the video that is referenced in the notification.

Previously, users may have been notified when a new video in a series of videos was released. However, a season of a series or the entire series may have ended or may not have any new episodes that are to be released. Therefore, a user who only partially consumed the series may not be notified about the unviewed portion of the series. In addition, if the user's consumption progress in the series is not up-to-date, notification about a newly released video from the series may not be relevant to the user. For example, if a latest video released in the series is episode ten and a user has previously completed watching half of episode one, the user will not consider a notification of the latest episode (i.e., episode ten) of importance/relevance. In another example, if the user has never consumed any episodes in the series and has no reason to watch the series, the user may not consider the notification of the latest episode of importance/relevance. Therefore, if users receive notifications of new episodes in a series, the users may consider such notifications to be spam and may end up ignoring or deleting such notifications without regarding them.

Providing a large number of notifications or notifications which a user may consider spam may have adverse consequences. For example, unsolicited notifications may be considered undesirable and may cause the user to delete notifications or disable receipt of notifications. In some cases, the user may stop using a content sharing platform that sends excessive or irrelevant notifications.

Videos included in a series may be very popular and be potentially interesting to many users. However, in view of a large volume of videos available to users on various content sharing platforms, the users may not necessarily remember about the series or about the point at which the user has previously stopped watching the series.

Aspects of the present disclosure provide customized timely notifications pertaining to a series of episodic content items to users who have consumed videos in the series. These improved notifications are relevant to the users being notified and can cause them to consume new portions of the series not previously watched (e.g., a next video or a next chronological scene/time immediately following the point at which the user has previously stopped watching a video from the series).

As used herein, the term "content item" may refer to an electronic file that can be executed or loaded using software, firmware or hardware configured to present the content item to an entity.

The present disclosure often references videos for simplicity and brevity. However, the teaching of the present disclosure are applied to content items generally and can be applied to various types of content or content items, including for example, video, audio, text, images, program instructions, etc. The content items referred to herein represent viewable and/or shareable content items.

The present disclosure often references episodes for simplicity and brevity. However, the teaching of the present disclosure are applied to content items generally and can be applied to various types of content or content items, including for example, episodes of videos, audio, text, images, program instructions, etc. The episodes referred to herein represent viewable and/or shareable content items.

FIG. 1 illustrates an example system architecture 100, in accordance with one implementation of the disclosure, for customized timely notifications pertaining to a series of videos, where the notifications are based on a notifiable event. The system architecture 100 includes client devices 110A through 110Z, a network 105, a data store 106, a content sharing platform 120, a server 130, and a third party social network platform 150. In one implementation, network 105 may include a public network (e.g., the Internet), a private network (e.g., a local area network (LAN) or wide area network (WAN)), a wired network (e.g., Ethernet network), a wireless network (e.g., an 902.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content items, such as images, videos, web pages, documents, etc. For example, the media viewer 111 may be a web browser that can access, retrieve, present, and/or navigate content items (e.g., web pages such as Hyper Text Markup Language (HTML) pages, digital media items, etc.) served by a web server. The media viewer 111 may render, display, and/or present the content items (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130. Although client devices 110A-110Z are shown, fewer or a greater number of devices may be used.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. Content sharing platform 120 may include any type of content delivery network providing access to content and/or media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel.

Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. An activity feed may be a list of recent activity associated with the user and occurring on the social network. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Although channels are described as one implementation of a content sharing platform, implementations of the disclosure are not limited to content sharing platforms that provide content items via a channel model.

Each channel may include one or more content items 121. Examples of a content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item or a media content item.

A content item 121 may be consumed via the Internet and/or via a mobile device application. As used herein, "media," "media item," "online media item," "digital media," "digital media item," "content," and "content item" can include an electronic file that can be executed or loaded using software, firmware or hardware configured to present the digital content item to an entity. In one implementation, the content sharing platform 120 may store the content items 121 using the data store 106.

The third party social network platform 150 may be and/or include one or more computing devices (e.g., servers), data stores, networks, software components, and/or hardware components that may be used to allow users to connect to, share information, and/or interact with each other using one or more mobile devices (e.g., phones, tablet computers, laptop computers, wearable computing devices, etc.) and/or any other suitable devices. For example, the third party social network platform 150 may enable telephony communication, Short Message Service (SMS) messaging, Multimedia Message Service (MMS) messaging, text chat, video chat, and/or any other communication between users. The third party social network platform 150 may present to a user a listing (e.g., activity feed, feed, stream, wall, etc.) of objects (e.g., posts, content items (e.g., videos, images, audios, etc.), status updates, favorability indications, tags, messages, etc.) provided by other users of the third party social network platform 150. The third party social network platform 150 may also include a content sharing aspect that allows users to upload, view, tag, share, and/or perform any other function on content, such as text content, video content, image content, audio content, etc. Other users of the third party social network platform 150 may comment on the shared content, discover new content, locate updates, share content, and otherwise interact with the provided content.

In one implementation, the content sharing platform 120 may be integrated with the third party social network platform 150. For example, the third party social network platform 150 may use the content sharing platform 120 to provide users with content sharing, content storage, content streaming, content processing, and/or any other service. In one example, a user of the third party social network platform 150 may upload and/or share content via the content sharing platform 120. In another implementation, as depicted in FIG. 1, the third party social network platform 150 may be separate from the content sharing platform 120.

In one implementation, the server 130 may be one or more computing devices (e.g., a rackmount server, a server computer, etc.). In one implementation, the server 130 may be included in the content sharing platform 120, and/or the third party social network platform 150. In another implementation, the server 130 may be separate from either or both of the content sharing platform 120 and/or the third party social network platform 150, but may communicate with (e.g., exchange data with) the content sharing platform 120 and/or the third party social network platform 150.

The server 130 may include a notification component 131 for providing customized timely notifications of a series of videos to users of the content sharing platform 120, the third party social network platform 150, and/or any other platform. The notifications are based on one or more notifiable events. In one implementation, the notification component 131 can create and/or otherwise obtain notifications to provide to users.

Although implementations of the disclosure are discussed in terms of content sharing platforms and promoting social network sharing of a content item on the content sharing platform, implementations may also be generally applied to any type of social network providing connections between users or to any type of content delivery platform providing content to end users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120, the server 130, the third party social network platform 150, and/or any other component of the system 100.

Notifiable event(s) pertaining to the series of videos may be related to a social event, a creator event, a user event, a video list event, or other event. A user may perform an action, triggering a notifiable event.

A social event related to the series may include an endorsement, a curation, a share, a favorite/like (e.g., an addition of a video in the series to a list of favorite content items), or other kind of syndicatable action with respect to a video in the series or the series itself. The social event may originate from a friend or social network contact of the user who receives the notification. In an implementation, the social event may be for the series or for a particular episode in the series. In an implementation, the series may be referred to as a canonical list. The canonical list may be an ordered list of items linked together, where the ordered list may include more than one episode of videos that are linked together. For example, an ordered list may be a series, where the series represent a television show and videos in the series may represent episodes of the television show. In another example, the series may represent a movie series and videos in the series may represent movies of the movie series. In another example, the series may represent a competition (e.g., a sports competition, a science competition, a music competition, etc.), and videos in the series may represent videos of events of the competition. In another example, the series may represent a conference, and videos in the series may represent videos of events of the conference. In another example, the series may represent a mini-series, a list of movies starring a particular actor or produced, directed, or created by the same person, a genre of videos, foreign language videos, videos having a commonality, etc.

A creator event may be an event occurring when new metadata is added to a video or a video endorsement about a video or the series. In an implementation, a person who creates or otherwise uploads the video may provide some new metadata to the video that was not added in the past. For example, the creator may tag relevant actors starring in the video. In another implementation, the creator may provide a comment or an endorsement on a video or the series as a whole. In another implementation, the creator may create an event to alert fans of a series of an upcoming important occurrence. For example, the creator may alert fans of an upcoming cliffhanger in the series. Other types of creator events may be considered a notifiable event.

A user event may be an event triggered by a user who is to receive the notification. The user event may be an endorsement of a video in the series, a search event such as searching of a term or phrase for a query related to a video in the series or the series itself, etc. The user event may be triggered by the user who is to receive the notification consuming a related video in another similar series.

A video list event may be an event triggered by a video in the series or the series itself reaching a certain view count or a particular milestone defined by a threshold condition. For example, the video/series may reach a threshold number of hits. In another example, the video/series may reach a 5-year milestone (e.g., the series is 5 years old).

In an implementation, the server 130 may receive an action representing a notifiable event from a client device operated by a user. However, the user may not be aware that the action is considered a notifiable event. The user may perform an action such as endorse a video, perform a search for a video, etc. as he/she typically would, and may not expect to receive a notification in response to this action. In another implementation, a user may be aware that the action is a notifiable event and may purposely perform the action in order to trigger a notification to other users. For example, the creator of a video may wish to add metadata to his or her series to trigger a notification to fans of the series.

Suppose now that Bonnie and Julie are friends on a social networking site. If Julie consumes an episode in Series X and endorses or "likes" either the episode or Series X on the social networking site/app (or another site), Bonnie may wish to also view Series X or continue watching an episode of Series X where she stopped watching. When it is determined that Bonnie has previously watched a portion but not the entire Series X, the same series that Julie has liked or endorsed, Bonnie may need to be reminded to continue watching Series X. However, if Bonnie starts receiving periodic notifications dedicated solely to reminders to watch Series X, Bonnie may consider such notifications spam or non-interesting, and may ignore them. On the other hand, if such a notification is sent to Bonnie when Julie likes Series X, Bonnie may wish to discuss Series X with Julie, and the notification reminding her to continue watching an unviewed portion of Series X would be important to Bonnie. Therefore, notification component 131 provides Bonnie with a notification indicating that Julie has liked Series X, and includes a reference to the unviewed video or portion of the video in Series X (e.g., the portion immediately following a point at which Bonnie stopped the video, or a video immediately following the last video that Bonnie watched in the series).

In another example, suppose that Series X is trending on many websites and has become vastly popular due to a new actor joining the cast of Series X. Many new viewers have recently started consuming Series X. However, Bonnie has stopped watching Series X (e.g., after consuming the first two episodes of Series X) and is not aware of its new popularity. A notification indicating Series X's popularity (e.g., that Series X has reached one million views) and including a reference to an unviewed portion of Series X, may prompt Bonnie to select the reference and continue watching Series X so she can discuss the series with her co-workers the next day.

Figure 2:
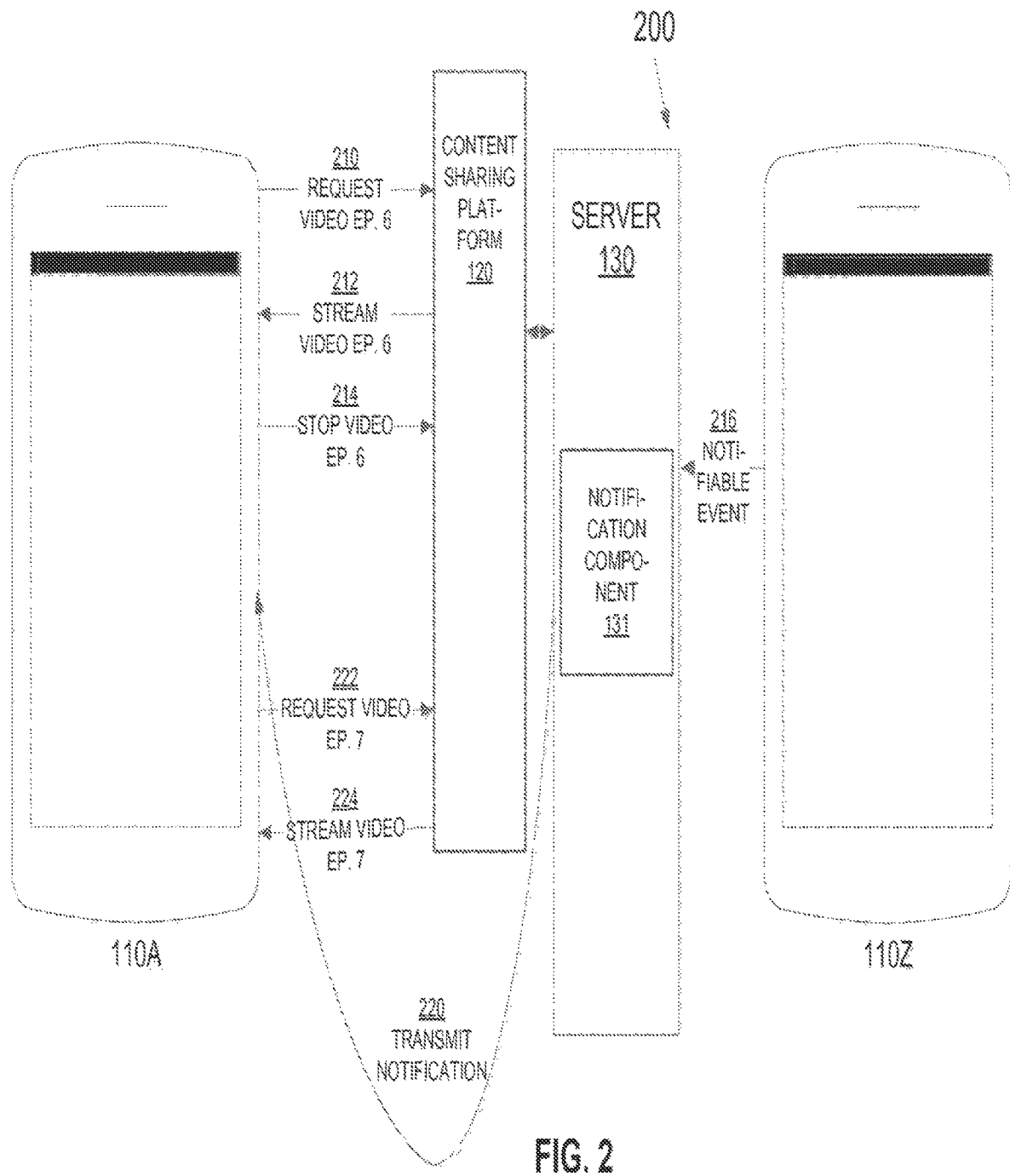
FIG. 2 is a flow diagram illustrating a communication flow between a server, a content sharing platform and client devices, according to some implementations of the disclosure.

FIG. 2 is a flow diagram illustrating a communication flow 200 between the server 130, including the notification component 131, the content sharing platform 120 and client devices 110A and 110Z, according to some implementations of the disclosure. Although two client devices are depicted in FIG. 2 for simplicity and brevity, additional client devices may be interacting with server 130 and/or content sharing platform 120 as well. In the depicted embodiment, the client devices 110A and 110Z are mobile devices for simplicity and brevity. However, the client devices 110A and/or 110Z may be another type of device. Each of the client devices 110A and 110Z may communicate with the server 130 and/or the content sharing platform 120 via the network 105 (shown in FIG. 1).

Suppose that a first user employing the client device 110A is watching a video series called "Series X." Series X may be made up of multiple episodes. The first user may issue a request 210, via the client device 110A, to the content sharing platform 120, to request video episode #6. The content sharing platform 120, after receiving the request 210, may transmit a stream 212 of video episode six to client device 110A. The first user may then issue a stop video request 214 to stop (or pause) video episode #6. In an implementation, the first user may have partially viewed video episode #6 and stopped or paused the video. In another implementation, the first user may have completed consuming episode #6. The content sharing platform 120 may inform the server 130 of the first user's consumption of episode six. In an implementation, the content sharing platform 120 and the server 130 communicate via network 105 (shown in FIG. 1).

At some point in time after the first user has consumed at least portion of a video (e.g., episode #1, . . . , episode #6) included in Series X, the server 130 may receive a notifiable event 216 pertaining to Series X from a second user employing client device 110Z. The notifiable event 216 may be a social event, a creator event, a user event, a video list event, or other type of event. In response to receiving the notifiable event 216, the server 130 determines that the first user has a highest affinity score with respect to Series X and selects the first user. The notification component 131 of the server 130 generates a customized timely notification for Series X based on the notifiable event. The notification component 131 may generate the notification and transmit the notification 220 to client device 110A, employed by the first user. As shown in FIG. 2, the first user may receive the notification sometime after stopping consumption of episode six.

Figure 3A:
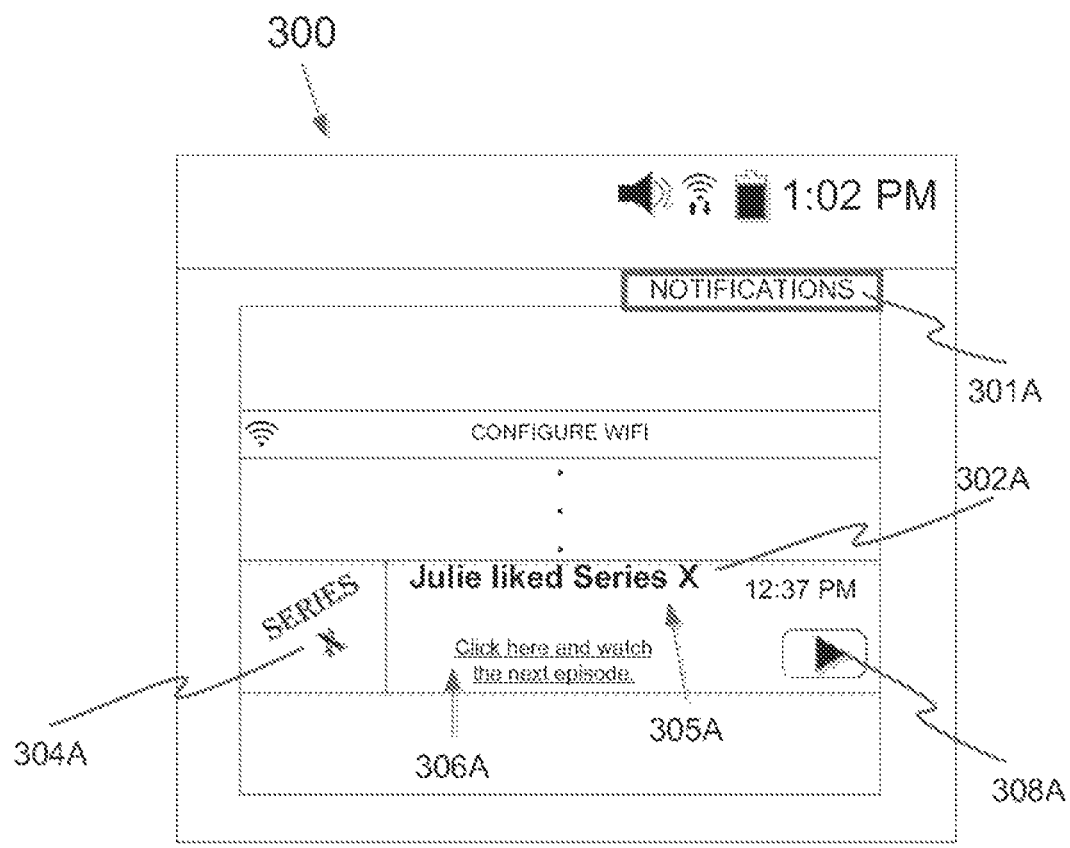
FIGS. 3A and 3B are examples of user interfaces displaying customized timely notifications, according to some implementations of the disclosure.
Figure 3B:
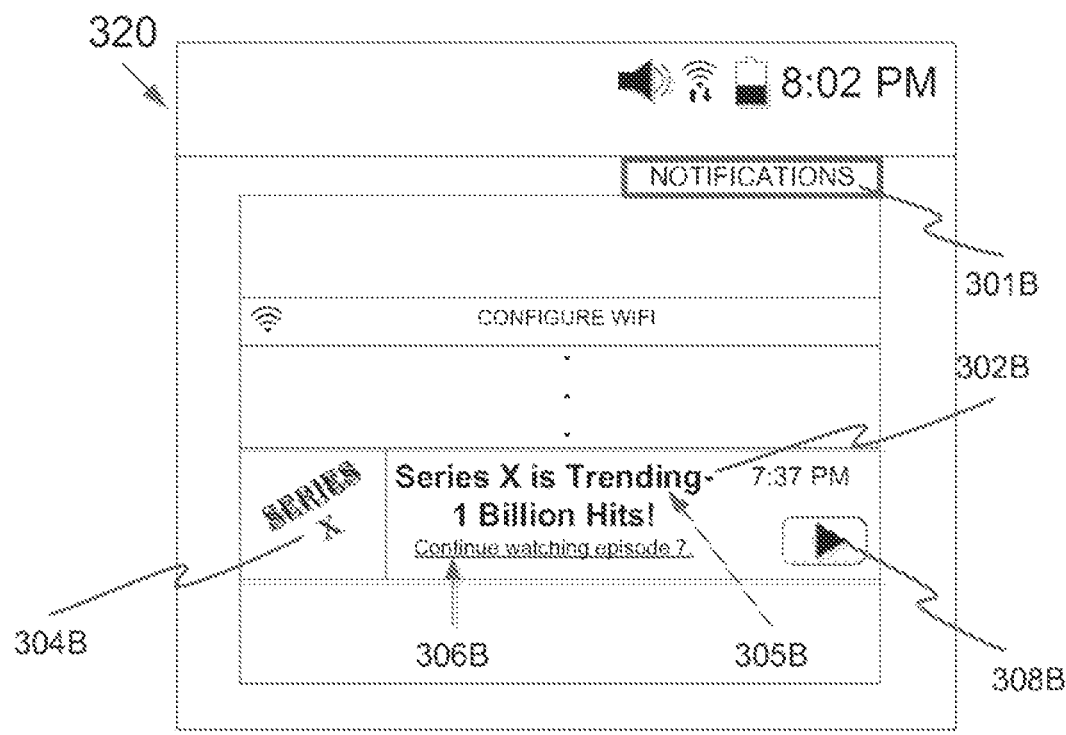

Examples of notifications provided to users are described herein with respect to FIGS. 3A and 3B.

After receiving the notification, the first user may select a reference or a link included within the notification. The link may be to a portion of a video that has not been previously viewed by the first user. For example, the link may be to a beginning of episode seven of Series X. Selection of the reference by the first user causes the client device 110A to transmit a request 222 to request video episode seven from the content sharing platform 120. The content sharing platform 120, in response to the request 222, transmits a stream 224 of video episode seven. The first user may then consume video episode seven.

The content sharing platform 120 may inform the server 130 when the user selects the reference.

In an implementation, the notifiable event 216 may be transmitted by the client device 110Z at any time after the first user employing the client device 110A consumes at least a portion of one video of Series X.

Although FIG. 2 is discussed in connection with streamed videos, the videos may be downloaded or otherwise accessed by users.

FIGS. 3A and 3B are examples of user interfaces displaying customized timely notifications, according to some implementations of the disclosure. FIG. 3A provides a user interface 300 displaying a custom timely notification 302A based on a notifiable event indicating that Julie liked Series X. The user interface 300 may include a "notifications" tab 301A as well as other information (e.g., a media player playing a video, a news feed, a list of recommended content items, etc.) and may be presented on a screen of a mobile device. The notification 302A may include a graphic area 304A which graphically and/or textually provides an indication of the series (for example, Series X). The notification 302A may include a text indication 305A of the notifiable event (e.g., that Julie has liked Series X). The notification 302A includes a reference 306A. The reference 306A may be a link such as a Uniform Resource Locator (URL), in one implementation. In an implementation, the notification may include any of a combination of text, links, and/or graphics. Upon selection of the reference 306A, in the depicted embodiment, the device is directed to a video of the next episode in Series X, where the next episode has not been previously viewed by the user. Specifically, upon selection of the reference 306A, the user is directed to a point in the video of a next episode of Series X where the user previously stopped watching. For example, if the user has previously finished watching episode six, then the user will be directed to view episode seven, in response to selecting the reference. In another implementation, if the user has previously finished watching a portion of an episode, the user will be directed to view the remainder of that episode, in response to selecting the reference. Referring to FIG. 1, upon selection of the reference, the client device is directed to content item 121, in content sharing platform 120, which is the next episode in the series not previously viewed by the user. In an implementation, the referenced episode may not necessarily be a latest episode in the series.

In an implementation, reference 306A includes a URL to the next episode. In addition to or in another implementation, the user may select button 308A in order to play the next episode. Selection of button 308A may direct the client device to a website and/or an app to display content item 121. In another implementation, selection of button 308A may provide the video in-line to the notification 302A or provide the video in a pop-up window.

FIG. 3B provides a user interface 320 displaying a custom timely notification 302B based on a notifiable event indicating that Series X is trending and has reached 1 billion hits. The notification 302B may include a graphic area 304B which graphically and/or textually provides an indication of the series (for example, Series X). The notification 302B may include a text indication 305B of the notifiable event. The notification 302B includes a reference 306B. The reference 306B may be a link such as a Uniform Resource Locator (URL), in one implementation. Upon selection of the reference 306B, in the depicted embodiment, the device is directed to a remainder of episode seven in Series X, where the remainder of episode seven has not been previously viewed by the user. For example, if the user has previously finished watching the first half of episode seven, then the user will be directed to view the reminder of episode seven, in response to selecting the reference. In another implementation, if the user has previously finished watching all of episode six (but not episode seven), the user will be directed to view episode seven, in response to selecting the reference.

Although the notifications in FIGS. 3A and 3B are shown as mobile notifications for simplicity and brevity, other type of notifications may also be generated and provided/displayed to users. For example, the notifications may be email, text messages, account notifications, etc. In an implementation, the notifications can be rendered in a variety of places including feeds of other recommended content, etc. For example, a notification can be provided on a website or an app such as a social networking website/app. A feed may include a timeline or other area/frame on the social networking website/app viewable by users.

Figure 4:
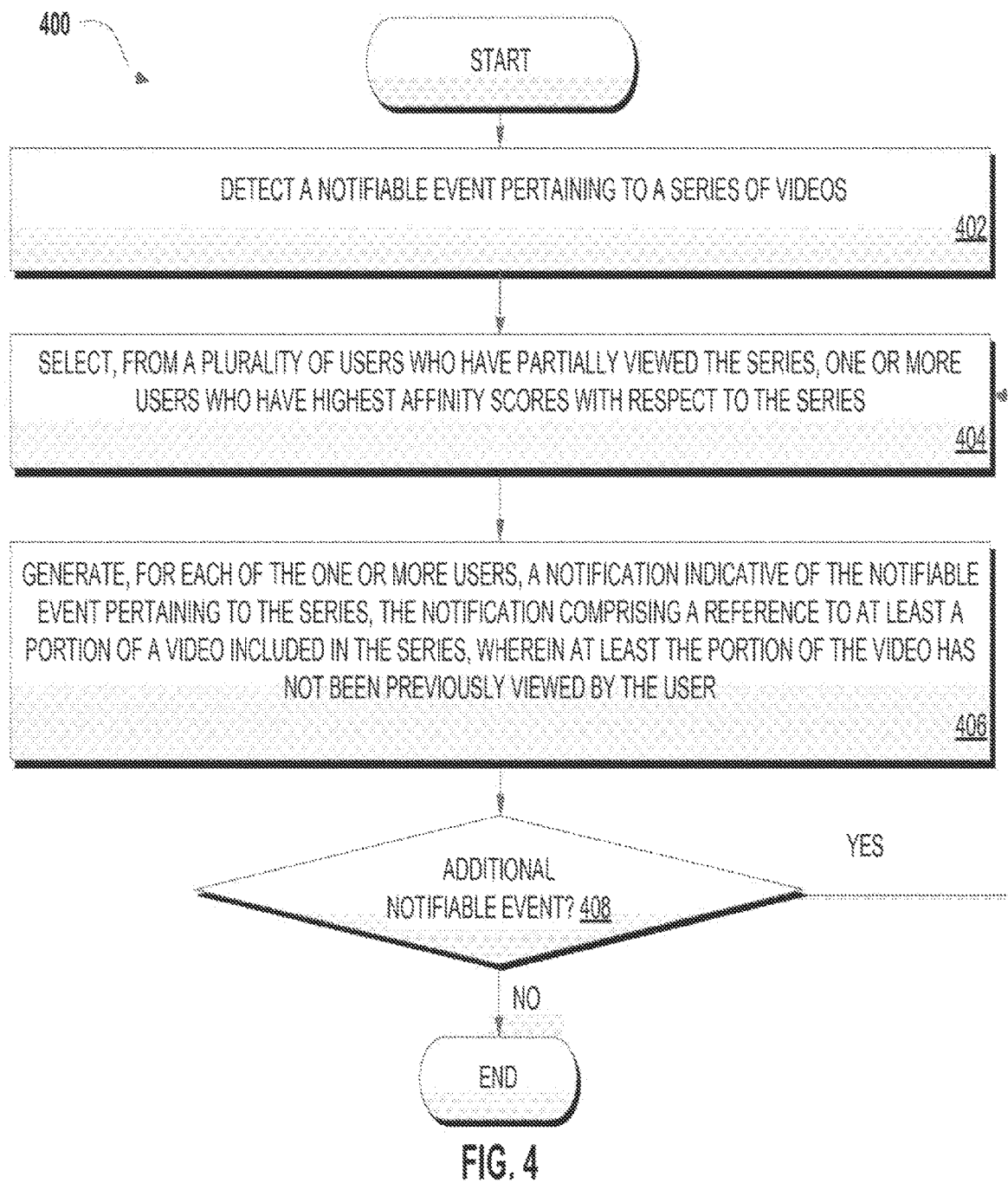
FIG. 4 is a flow diagram illustrating a method for generating a notification indicative of a notifiable event pertaining to a series, according to some implementations of the disclosure.

FIG. 4 is a flow diagram illustrating a method 400 for generating a notification indicative of a notifiable event pertaining to a series, according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by server 130 (e.g., processing device executing a notification component 131) as shown in FIG. 1.

As illustrated, method 400 begins at block 402 when the processing device detects a notifiable event pertaining to a series of videos. A log of notifiable events may be scanned to identify one or more events related to a series. One implementation of detecting the notifiable event will be described herein with respect to FIG. 5. The notifiable event pertaining to the series may be a social event, a creator event, a user event, a video list event or other events. The notifiable event may pertain to the series as a whole or to a video included in the series.

At block 404, the processing device selects, from a plurality of users who have partially viewed the series, one or more users who have highest affinity scores with respect to the series. The affinity score for the user, with respect to the series, is determined based at least on a number of videos consumed by the user from the series. The affinity scores for users may be logged. The log, for example, may include a list of series and for each series, affinity scores of various users may be recorded. In another implementation, each user may have one or more affinity score logs for one or more series. In some embodiments, users may be assigned different affinity scores with respect to different series.

A scanner in the server 130 may scan a plurality of user affinity score logs to determine respective affinity scores of users based on the series. For example, the scanner may scan user affinity score logs for one hundred users based on Series X. Each of the one hundred users may be assigned an affinity score from one to ten, where one is the lowest affinity score and ten is the highest affinity score. The scanner may determine the affinity scores of the users and select users that have affinity scores of eight or higher for Series X.

In an implementation, the affinity scores are calculated by a separate component or entity prior to the scanner performing the scanning. In another implementation, the affinity scores are calculated by the server 130. In an implementation, the scanner may be a MapReduce continuous scanner which iterates over all user affinity score logs in order to determine (the highest) affinity scores for a series. The MapReduce identifies an affinity score between a user and a series (based on the videos in the series consumed by the user). The affinity scores may be stored based on an identifier identifying a particular series. The identifier may be a name of the series, for example. In some implementations, a user's viewing history of videos from a series is logged and an affinity score of the user is calculated based on the user's viewing history associated with the series. For example, the number of videos viewed by the user may be determined based on the viewing history, and an affinity score of the user may be created based on the number of videos viewed by the user in the series.

In an implementation, the affinity score may be generated by the server 130, the content sharing platform 120, the third party social network platform 150, or another platform accessible by the server 130.

At block 406, the processing device generates, for each of the one or more users, a notification indicative of the notifiable event pertaining to the series. The notification includes a reference to at least a portion of a video included in the series, wherein at least the portion of the video has not been previously viewed by the user. After the generation of the notification, the notification may be transmitted to each of the one or more users. In an implementation, the notification component 131 in the server 130 in FIG. 1 generates and transmits the notification(s). In another embodiment, another component in the server 130 or outside the server 130 transmits the generated notification(s). A user employing client device 110A-110Z receives the notification. For example, the notification may be provided to the user as a graphical user interface shown in FIGS. 3A and 3B.

In in implementation, two or more users with highest affinity scores with respect to the series are selected from the plurality of users who have partially viewed the series. When a notification indicative of the notifiable event pertaining to the series is generated for each of the two or more users, a notification for a respective user comprises a reference to at least a portion of a video that has not been previously viewed by the respective user. Therefore, custom timely notifications, including respective custom references, are generated (and transmitted) for each of the two or more users.

Suppose that the user has partially viewed an episode of a video in the series. When the user selects the reference, the user will be directed to the point in the video at which he/she had most recently stopped watching the video. For example, suppose that the user watched up to 9 minutes 59 seconds of episode seven before the video was stopped/paused. When the user selects the reference, the user may resume watching the video at 10 minutes. In another implementation, the user may be provided a remembrance period of a predetermined number of seconds or minutes from the point in the video at which the user had most recently stopped watching. The remembrance period may allow a user to remember or refresh the portion of the video he/she last watched. For example, suppose that the remembrance period is 10 seconds. When the user who previously watched up to 9 minutes and 59 seconds of episode seven selects the reference, the user may resume watching the video at 9 minutes 49 seconds (based on the remembrance period).

The user could view the videos in a series out of order. For example, the user may have watched the videos in the following order: 2, 1, 4, 6. In some implementations, the last portion of the last video watched by the user in the series is used to determine the point to which the reference in the notification should point. For example, the reference to the portion of the video included in the notification to the user may be to episode seven, as the user has previously last consumed episode six. Thus, the order in which the user consumes the episodes may not be considered.

Suppose that a user has not watched any portion of the episodes in the series. However, the user may have a friend who loves the series or notices that the series is trending. Even though the user may have a low affinity score with respect to the series, the user may wish to receive notifications of series that his friend likes or series that are trending. In an implementation, the user may be provided with a notification, in response to receiving a notifiable event such as his/her friend liking the series (or a video in the series) or based on a trending series.

At decision block 408, it is determined whether an additional notifiable event is detected. If no additional notifiable event is detected, the method ends. If however, an additional notifiable event is detected at decision block 408, the method returns to block 404, as depicted in FIG. 4. For example, the additional notifiable event may relate to a video in Series X, to Series X as a whole, or to another video in another series or to another series.

In an implementation, the notification in block 406 may be generated periodically on a schedule. For example, notifications may be generated during off-peak hours when the server 130's utilization is lower or cheaper. In another example, notifications may be generated every hour. However, the notification may be transmitted to user(s) during certain hours. For example, if a notification is generated at 2 AM Pacific Standard Time, the notification may not be transmitted to user on the east coast at 2 AM. Instead, the notification may be transmitted during business hours and instead be transmitted at 9 AM the next morning. This way, the user does not receive the notification while he/she is sleeping. In in implementation, the user may specify a time-range during which notifications are to be received on his/her device. Therefore, the notifications are transmitted at a particular time, as determined by the server 130 or by a user that will receive the notification.

Suppose that a first notification is being held for the user but not yet transmitted. During this time, it is possible that an additional notifiable event (in block 408 in FIG. 4) is detected. The first scanner may continuously scan for the notifiable event and detect it, for example. The notifiable event may relate to the same series for which a notification has already been generated for the user (in block 406) or another series. In an implementation, if the notifiable event is for the same series, the notification in block 406 may be updated to reflect the new notifiable event. For example, the notification may state: "Julie liked Series X and Series X is Trending-1 Billion Hits!" The reference to the video would remain the same in the updated notification. In an implementation, if the notifiable event is for a different series, a separate notification may be generated or the first notification (not yet transmitted) may be updated to include both notifiable events and two references to the portion of videos not previously watched by the user.

Figure 5:
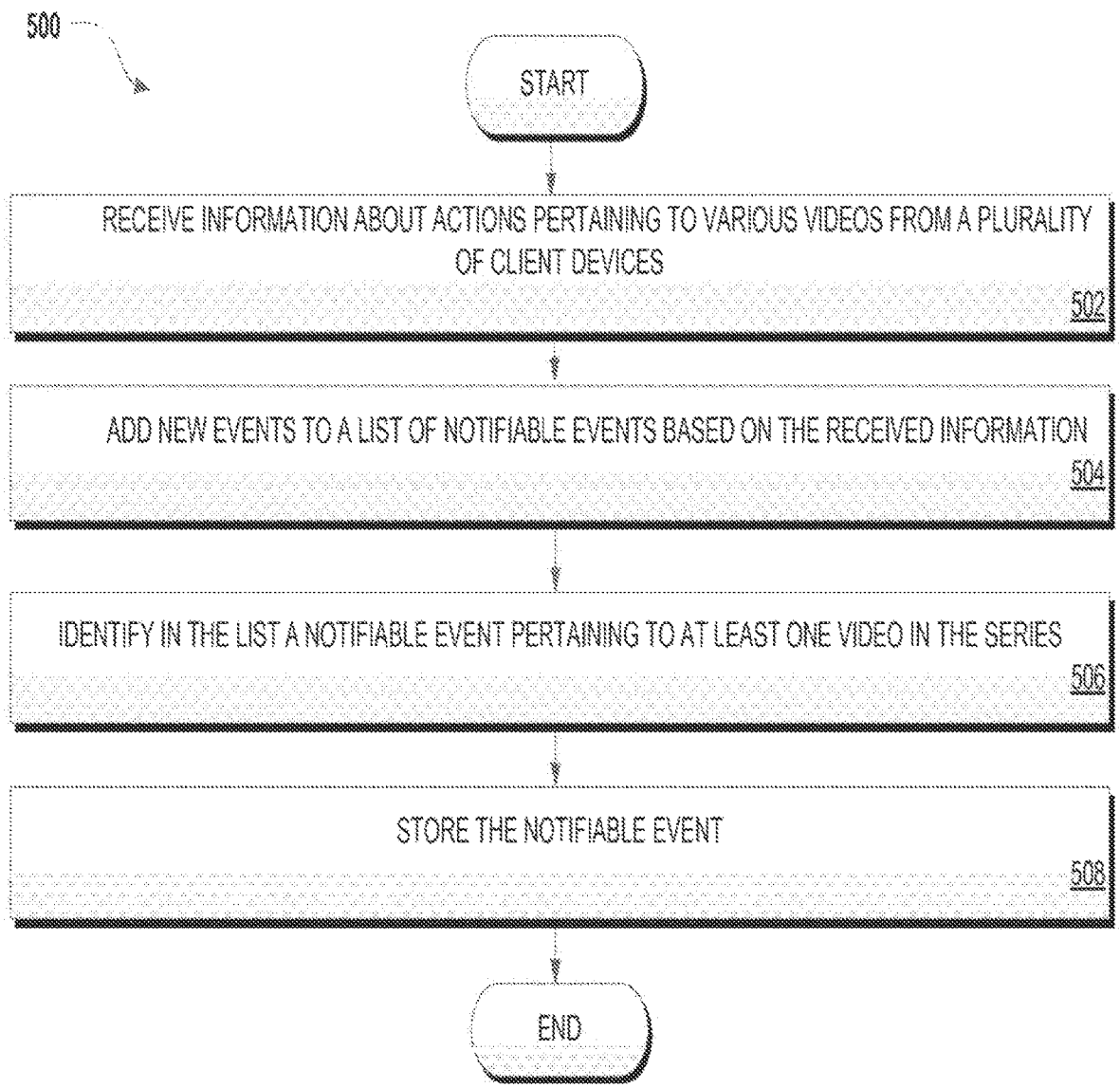
FIG. 5 is a flow diagram illustrating a method for detecting a notifiable event pertaining to a series of videos, according to some implementations of the disclosure.

FIG. 5 is a flow diagram illustrating a method 500 for detecting a notifiable event pertaining to a series of videos, according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof.

In one implementation, method 500 may be performed by server 130 (e.g., processing device executing a notification component 131) as shown in FIG. 1. In an implementation, the detecting of the notifiable event in FIG. 4, block 402 comprises one or more of the operations of method 500 described herein.

As illustrated, method 500 begins at block 502, when the processing device receives information about actions pertaining to various videos from a plurality of client devices. For example, a user may perform an activity representing a social event, a creator event, a user event, a video list event, or other event. In an implementation, the user may endorse a video in a series.

At block 504, the processing device can add new events to a list of notifiable events based on the received information. In an implementation, the list may be a user event log. For example, the list may be organized by series. For Series X, all actions pertaining to episodes in Series X (received in block 502) may be organized separately from other series.

At block 506, the processing device can identify in the list a notifiable event pertaining to at least one video in the series. For example, the notifiable event may be an endorsement by a particular user of episode seven of Series X.

At block 508, the processing device can store the notifiable event in a data store 106 or in another storage. For example, the endorsement by a particular user of episode seven of Series X is stored as a notifiable event of Series X.

In an implementation, the processing device continuously searches for actions which may be considered notifiable events associated with a plurality of videos. The user performing the action may or may not be aware that the action is considered a notifiable event.

In an implementation, as described above with respect to FIG. 4, a first scanner scans a plurality of user affinity score logs to identify users with high affinity scores with respect to various series of videos. A second scanner may scan user event logs for notifiable events. When a notifiable event is identified, the second scanner can determine whether the video that the event is related to is part of an episode or otherwise pertains to a series. Upon detecting the notifiable event(s) that pertains to a series, the second scanner may inform the server 130 to merge the notifiable events pertaining to the series with a subset of the plurality of users having a high affinity score (as determined by the first scanner) for the series. In another implementation, the first scanner may inform the server 130 to perform the merging based on a high affinity score instead. In an implementation, in order to determine which scan to perform first (e.g., the user affinity score log scan or the user event log scan), a cost analysis may be performed. Based on the cost analysis, the lesser expensive scan is performed first. For example, if the user affinity score logs are significantly longer than the user event logs, then the user event log scan can be performed first. In another implementation, another analysis may determine which scan to perform first.

After the merging is performed, the series and respective notifiable events are provided to the notification component 131 of the server 130 and appropriate notifications can be generated and transmitted to users (as described in FIG. 4). In an implementation, prior to transmitting the notification, the server 130 (and/or the notification component 131, or another component) determines whether the notification meets de-spam constraints. In other words, notifications that are relevant to a user and are not considered spam are routed to the user. Thus, a notification is caused to be sent to a client device of a user upon determining that the notification satisfies a spam filtering condition. For example, a user may wish to only receive notifications for series where he/she has consumed some videos or portions of some videos within the past year. A spam filtering condition may be set (e.g., by server 130 in response to user input) to provide a notification only if the notification is indicative of a series consumed in the past year. If a notification is generated for a series that is not consumed by the user within the past year, the notification does not satisfy the spam filtering condition and is thus not sent to the user. In another implementation, the spam filtering condition may be indicative of a maximum frequency of notifications per period. For example, if a maximum frequency of notifications is set (e.g., by server 130 in response to user input or by default) as one per week, any additional notifications other than the one a week will not pass through the spam filtering condition and will be blocked. In another implementation, instead of blocking additional notifications, the notifications not sent will be held in a queue and will be provided to a user device after the week ends.

In an implementation, the reference in the notification pertains to at least one existing video in the series and the notification is generated before a new video is added to the series. That is, if the series currently has 10 episodes and the user last watched episode 6, a notification referencing episode 7 can be generated and provided to the user before episode 11 is added to the series.

In an implementation, the notifiable events are scanned by the server 130 or another entity. In an implementation, the second scanner may be a MapReduce continuous scanner which iterates over all logs (as described in block 508 in FIG. 5) in order to find notifiable events.

Figure 6:
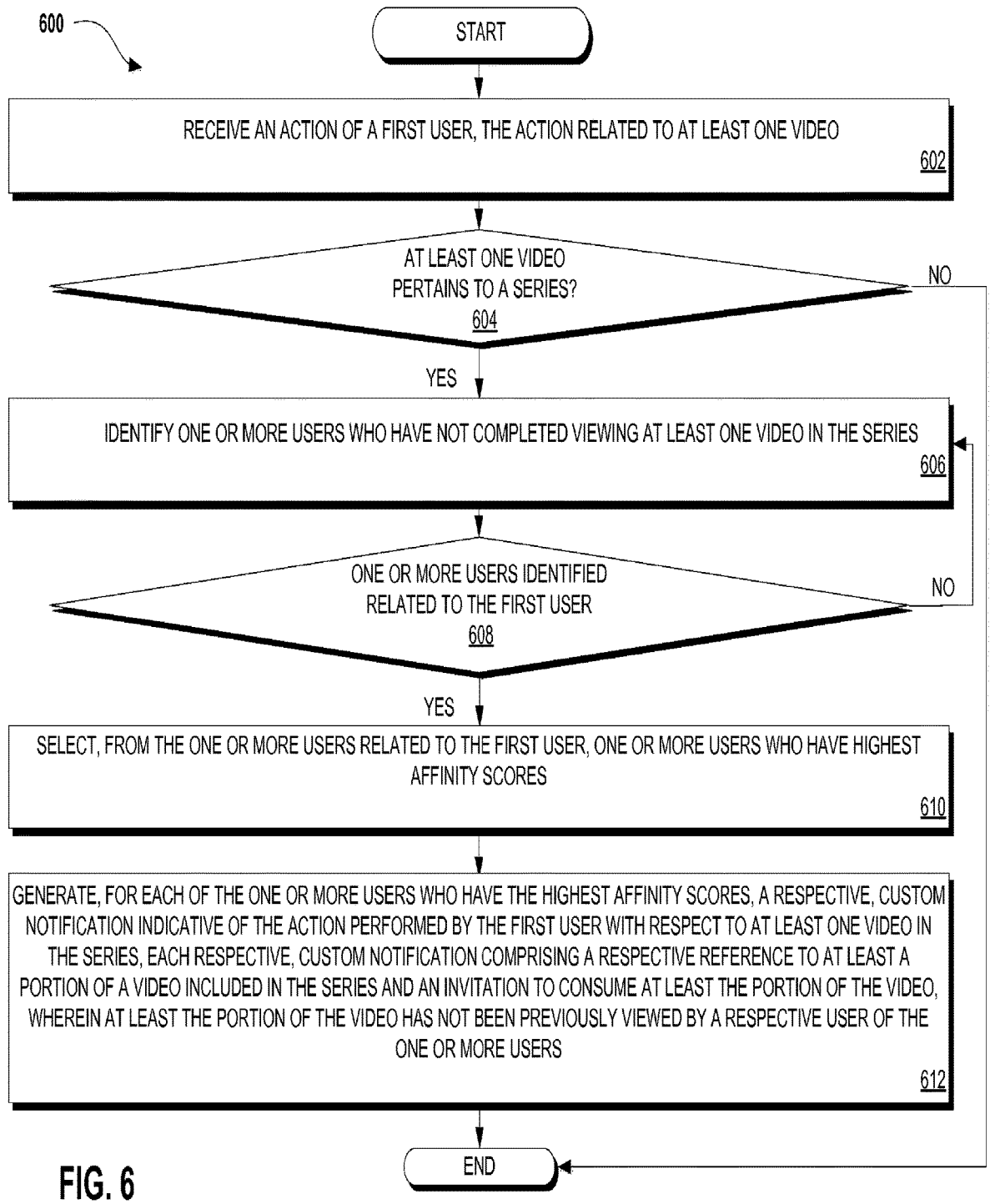
FIG. 6 is a flow diagram illustrating a method for generating custom notifications based on a social event, according to some implementations of the disclosure.

FIG. 6 is a flow diagram illustrating a method 600 for generating custom notifications based on a social event, according to some implementations of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof.

In one implementation, method 600 may be performed by server 130 (e.g., processing device executing a notification component 131) as shown in FIG. 1.

As illustrated, method 600 begins at block 602, when the processing device receives an action of a first user, where the action relates to at least one video. In an implementation, the action may be a social action such as an endorsement of a video, sharing a video, a video curation action, marking of a video as a favorite, or other type of syndicatable action.

At decision block 604, the processing device determines whether the at least one video pertains to a series. In response to determining that the at least one video does not pertain to a series, method 600 ends. For example, if an endorsement is received for a video that is not a part of a series, the method ends.

In response to determining that the at least one video pertains to a series, at block 606, the processing device identifies one or more users who have not completed viewing at least one video in the series. For example, if the video is episode seven of Series X, one or more users who have not completed watching at least one video in Series X are identified.

At decision block 608, the processing device determines whether the one or more identified users are related to the first user who initiated the action in block 602. For example, the processing device determines whether an association exists between the first user and one or more second users. For example, the first user may be a friend of the one or more second users, the first user may have listed the one or more second users in an address book, etc. Some relationship between the first user and the one or more second users may exist. The relationship may be determined by the third party social network platform 150 and communicated to the server 130 in FIG. 1.

In response to determining that the one or more second users identified are not related to the first user, method 600 returns to block 606. At block 606, the processing device identifies one or more new users who have not completed viewing at least one video in the series. The processing device may perform a scan to identify one or more new users who have not completed viewing at least one video in the series. If a new user is identified that was not previously identified, the processing device then determines whether that new user identified is related to the first user, in block 608. The method then repeats if the processing device, in block 608, determines that the new user is not related to the first user.

In response to determining that one or more users identified are related to the first user in decision block 608, at block 610, the processing device selects, from the one or more users related to the first user, one or more users who have highest affinity scores. For example, if the first user is a friend of the one or more users on an app managed by the third party social network platform 150, the one or more users are related to the first user.

At block 612, the processing device can generate, for each of the one or more users who have the highest affinity scores, a respective, custom notification indicative of the action performed by the first user with respect to at least one video in the series. Each of the respective, custom notifications includes a respective reference to at least a portion of a video included in the series and an invitation to consume at least the portion of the video. At least the portion of the video has not been previously viewed by a respective user of the one or more users. The notification received by one or more users may be presented to the users in a form of a user interface, as shown in FIGS. 3A and 3B. The notifications generated for multiple users may have references to different episodes/episode portions since multiple users may finish watching the series at different points within the series.

Figure 7:
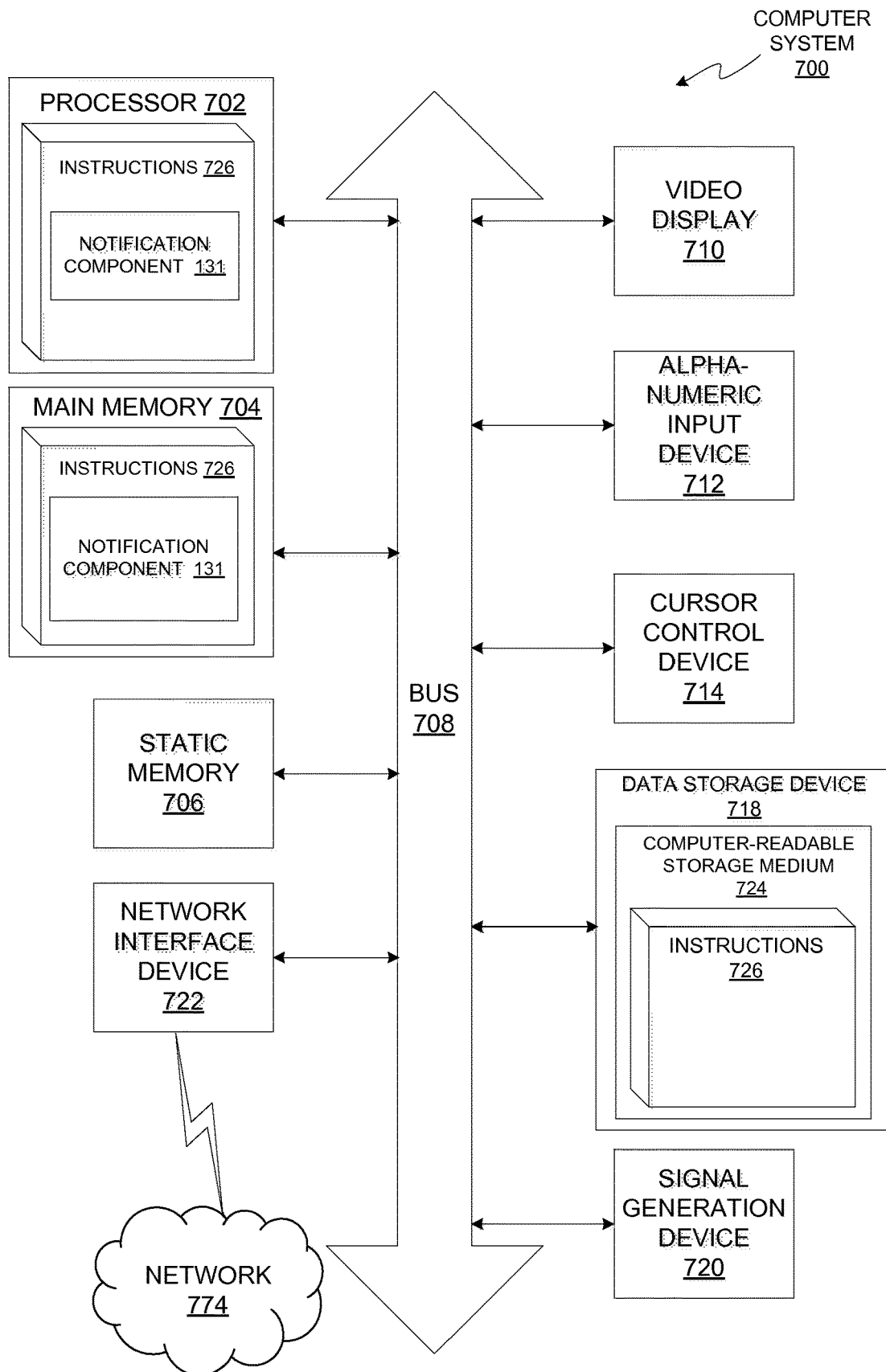
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable storage media. The instructions 726 may further be transmitted or received over a network 774 via the network interface device 722.

In one implementation, the instructions 726 include instructions for implementing a notification component 131 as described with respect to FIG. 1. While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "sending," "determining," "identifying," "presenting," "generating," "associating," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting, by a processing device of a server, a notifiable event pertaining to a series of videos, wherein detecting the notifiable event comprises searching a log of notifiable events pertaining to the series of videos;
    determining, by the processing device, a user who has watched a portion of at least one video in the series of videos or at least one video in the series of videos, wherein the user is assigned an affinity score indicating a user interest to continue viewing the series of videos;
    generating, by the processing device, a notification identifying the notifiable event pertaining to the series of videos, the notification comprising a reference to an unwatched next video in the series of videos; and
    transmitting the notification to the user.

2. The method of claim 1, wherein the notifiable event comprises adding metadata to a video in the series of videos.

3. The method of claim 1, wherein the reference corresponds to a link to view the video included in the series of videos.

4. The method of claim 1, wherein the video corresponds to a point of the series of videos that the user has not viewed.

5. The method of claim 1, wherein the user is associated with a plurality of logs, each log being associated with an affinity score for one or more series of videos viewed by the user.

6. The method of claim 1, wherein the log includes a list of series, and for each series, an affinity score for a plurality of users.

7. The method of claim 1, wherein the affinity score is based on a number of videos of the series of videos that the user has viewed.

8. A non-transitory computer readable medium comprising instructions, which when executed by a processing device, cause the processing device to perform operations comprising:
    detecting a notifiable event pertaining to a series of videos, wherein detecting the notifiable event comprises searching a log of notifiable events pertaining to the series of videos;
    determining a user who has watched a portion of at least one video in the series of videos or at least one video in the series of videos, wherein the user is assigned an affinity score indicating a user interest to continue viewing the series of videos;
    generating a notification identifying the notifiable event pertaining to the series of videos, the notification comprising a reference to an unwatched next video in the series of videos; and
    transmitting the notification to the user.

9. The non-transitory computer readable medium of claim 8, wherein the notifiable event comprises adding metadata to a video in the series of videos.

10. The non-transitory computer readable medium of claim 8, wherein the reference corresponds to a link to view the video included in the series of videos.

11. The non-transitory computer readable medium of claim 8, wherein the video corresponds to a point of the series of videos that the user has not viewed.

12. The non-transitory computer readable medium of claim 8, wherein the user is associated with a plurality of logs, each log being associated with an affinity score for one or more series of videos viewed by the user.

13. The non-transitory computer readable medium of claim 8, wherein the log includes a list of series, and for each series, an affinity score for a plurality of users.

14. The non-transitory computer readable medium of claim 8, wherein the affinity score is based on a number of videos of the series of videos that the user has viewed.

15. A system comprising:
    a memory; and
    a processing device, operatively coupled with the memory, to:
    detect a notifiable event pertaining to a series of videos, wherein detecting the notifiable event comprises searching a log of notifiable events pertaining to the series of videos;

determine a user who has watched a portion of at least one video in the series of videos or at least one video in the series of videos, wherein the user is assigned an affinity score indicating a user interest to continue viewing the series of videos;

generate a notification identifying the notifiable event pertaining to the series of videos, the notification comprising a reference to an unwatched next video in the series of videos; and transmit the notification to the user.

16. The system of claim 15, wherein the notifiable event comprises adding metadata to a video in the series of videos.

17. The system of claim 15, wherein the reference corresponds to a link to view the video included in the series of videos.

18. The system of claim 15, wherein the video corresponds to a point of the series of videos that the user has not viewed.

19. The system of claim 15, wherein the user is associated with a plurality of logs, each log being associated with an affinity score for one or more series of videos viewed by the user.

20. The system of claim 15, wherein the log includes a list of series, and for each series, an affinity score for a plurality of users.

* * * * *